US011984813B2

United States Patent
Xu et al.

(10) Patent No.: US 11,984,813 B2
(45) Date of Patent: May 14, 2024

(54) SYNCHRONOUS RECTIFICATION CONTROL SYSTEM AND METHOD FOR QUASI-RESONANT FLYBACK CONVERTER

(71) Applicants: SOUTHEAST UNIVERSITY, Jiangsu (CN); CSMC TECHNOLOGIES FAB2 CO., LTD., Wuxi (CN)

(72) Inventors: Shen Xu, Wuxi (CN); Siyu Zhao, Wuxi (CN); Congming Qi, Wuxi (CN); Sen Zhang, Wuxi (CN); Xiaoyu Shi, Wuxi (CN); Weifeng Sun, Wuxi (CN); Longxing Shi, Wuxi (CN)

(73) Assignees: SOUTHEAST UNIVERSITY, Jiangsu (CN); CSMC TECHNOLOGIES FAB2 CO., LTD., Wuxi (CN)

( * ) Notice: Subject to any disclaimer, the term of this patent is extended or adjusted under 35 U.S.C. 154(b) by 314 days.

(21) Appl. No.: 17/435,789

(22) PCT Filed: May 15, 2020

(86) PCT No.: PCT/CN2020/090495
§ 371 (c)(1),
(2) Date: Sep. 2, 2021

(87) PCT Pub. No.: WO2020/228818
PCT Pub. Date: Nov. 19, 2020

(65) Prior Publication Data
US 2022/0052613 A1 Feb. 17, 2022

(30) Foreign Application Priority Data
May 16, 2019 (CN) .......................... 201910409155.3

(51) Int. Cl.
*H02M 3/335* (2006.01)
*H02M 1/00* (2006.01)
*H02M 1/38* (2007.01)

(52) U.S. Cl.
CPC ..... *H02M 3/33592* (2013.01); *H02M 1/0058* (2021.05); *H02M 1/38* (2013.01)

(58) Field of Classification Search
CPC .................................. H02M 1/38; H02M 3/01
See application file for complete search history.

(56) References Cited

U.S. PATENT DOCUMENTS 7,548,436 B1 6/2009 Chen
8,922,255 B1 12/2014 Young et al.
(Continued)

FOREIGN PATENT DOCUMENTS

CN 106100352 11/2016
CN 107147300 9/2017
(Continued)

OTHER PUBLICATIONS

PCT International Search Report (w/ English translation) for corresponding PCT Application No. PCT/CN2020/090495, dated Aug. 21, 2020, 4 pages.

*Primary Examiner* — Gustavo A Rosario-Benitez
(74) *Attorney, Agent, or Firm* — Dority & Manning, PA

(57) ABSTRACT

A synchronous rectification control system and method for a quasi-resonant flyback converter are provided. The control system includes a switching transistor voltage sampling circuit configured to sample an output terminal voltage of the switching transistor to obtain a sampled voltage of the switching transistor; a sampling calculation module configured to obtain a dead-time based on the sampled voltage of the switching transistor and a preset relationship, the preset relationship being a correspondence between the duration of the sampled voltage of the switching transistor being below a first preset value and the dead-time during an on-time of a switching cycle of the switching transistor, the dead-time being a time from when the switching transistor is turned off to when the synchronous rectification transistor is turned on;

(Continued)

and a control module configured to receive the dead-time and control switching of the synchronous rectification transistor based on the dead-time.

11 Claims, 6 Drawing Sheets

(56) References Cited

U.S. PATENT DOCUMENTS

| | | | | |
|---|---|---|---|---|
| 9,083,255 | B2* | 7/2015 | Duan | H02M 3/33592 |
| 9,906,161 | B1* | 2/2018 | Chen | H02M 3/33553 |
| 9,917,525 | B1* | 3/2018 | Kleinpenning | H02M 1/08 |
| 10,461,644 | B1* | 10/2019 | Gong | H02M 3/1582 |
| 10,658,937 | B1* | 5/2020 | Zafarana | H02M 3/33592 |
| 2015/0280584 | A1* | 10/2015 | Gong | H02M 3/33592 |
| | | | | 363/21.13 |
| 2017/0054375 | A1* | 2/2017 | Phadke | H02M 3/01 |
| 2017/0179832 | A1* | 6/2017 | Hwang | H02M 3/33569 |
| 2019/0149058 | A1* | 5/2019 | Mao | H02H 7/1213 |
| | | | | 363/21.02 |
| 2020/0036280 | A1* | 1/2020 | Yang | H02M 3/33592 |

FOREIGN PATENT DOCUMENTS

| | | |
|---|---|---|
| CN | 107896062 | 4/2018 |
| CN | 108988652 | 12/2018 |

* cited by examiner

SYNCHRONOUS RECTIFICATION CONTROL SYSTEM AND METHOD FOR QUASI-RESONANT FLYBACK CONVERTER

This application is a national stage of International Application No. PCT/CN2020/090495, filed on May 15, 2020, which claims priority to Chinese Patent Application No. 201910409155.3, filed on May 16, 2019. Both of the aforementioned applications are hereby incorporated by reference in their entireties.

TECHNICAL FIELD

The present disclosure relates to flyback converters, and in particular to a synchronous rectification control system and method for a quasi-resonant flyback converter.

BACKGROUND

Power supply is an indispensable part of each electronic device, and its performance is directly related to the technical specifications of the electronic device and its ability to work safely and reliably, and a main application is switch mode power supply (SMPS). Switch power supply, also known as switch converter, is a power supply that uses modern power electronics technology to make the output voltage constant by controlling the on/off ratio or frequency of switch devices.

Generally, in small and medium power flyback converter power supply, the forward conduction loss of the rectifier diode (DR) caused by the voltage drop is a significant part of the system losses. If The output voltage of the power supply does not exceed ten times of the forward voltage drop of the rectifier diode, the conduction loss will account for more than 50% of the total power loss.

In order to improve efficiency and reduce the loss, the use of synchronous rectification technology has become a necessary means. It replaces the traditional rectifier diode or Schottky diode with a Metal-Oxide-Semiconductor Field-Effect Transistor (MOSFET) with very low on-resistance to reduce the output rectification loss. Compared with traditional Schottky diodes, synchronous rectification transistor has low on-resistance and small forward voltage drop, resulting in low rectification loss. In addition, the synchronous rectification transistor also has the advantages of high cutoff voltage and low reverse current.

SUMMARY

Therefore, it is necessary to provide a synchronous rectification control system and method for a quasi-resonant flyback converter.

A synchronous rectification control method for a quasi-resonant flyback converter is provided. The flyback converter includes a primary side of a transformer and a secondary side of the transformer. The primary side includes a primary winding and a switching transistor, and the secondary side includes a secondary winding, a synchronous rectification transistor and a resonant capacitor. The method includes sampling an output terminal voltage of the switching transistor to obtain a sampled voltage of the switching transistor; obtaining a dead-time based on the sampled voltage of the switching transistor and a preset relationship, the preset relationship being a correspondence between a duration of the sampled voltage of the switching transistor being below a first preset value and the dead-time during an on-time of the switching cycle, the dead-time being a time from when the switching transistor is turned off to when the synchronous rectification transistor is turned on; and controlling switching of the synchronous rectification transistor based on the dead-time.

A synchronous rectification control system for a quasi-resonant flyback converter is provided. The flyback converter includes a primary side of a transformer and a secondary side of the transformer. The primary side includes a primary winding and a switching transistor, and the secondary side includes a secondary winding, a synchronous rectification transistor and a resonant capacitor. The system includes a switching transistor voltage sampling circuit configured to sample an output terminal voltage of the switching transistor to obtain a sampled voltage of the switching transistor; a sampling calculation module configured to obtain a dead-time based on the sampled voltage of the switching transistor and a preset relationship, the preset relationship being a correspondence between the duration of the sampled voltage of the switching transistor being below a first preset value and the dead-time during an on-time of a switching cycle of the switching transistor, the dead-time being a time from when the switching transistor is turned off to when the synchronous rectification transistor is turned on; and a control module configured to receive the dead-time and control switching of the synchronous rectification transistor based on the dead-time.

Details of one or more embodiments of the present disclosure are presented in the accompanying drawings and description below. Other features, purposes and advantages of the present disclosure will become apparent from the specification, the accompanying drawings, and the claims.

BRIEF DESCRIPTION OF THE DRAWINGS

In order to more clearly describe and illustrate embodiments and/or examples of the present disclosure, reference may be made to the following drawings. The additional details or examples used to describe the drawings should not be considered as limiting the scope of any of the disclosed inventions, the currently described embodiments and/or examples, and the best mode of these inventions as currently understood.

DETAILED DESCRIPTION OF THE EMBODIMENTS

In order to facilitate the understanding of the present invention, a more comprehensive description of the present disclosure will be given below with reference to the corresponding accompanying drawings. The preferred embodiments of the present disclosure are given in the accompanying drawings. However, the disclosure can be implemented in many different forms and is not limited to the embodiments described herein. Rather, these embodiments are provided for the purpose of making the disclosure of the present disclosure more thorough and comprehensive.

Unless otherwise defined, all technical and scientific terms used herein have the same meaning as commonly understood by those skilled in the art belonging to the present disclosure. The terms used herein in the specification of the present disclosure are intended only for the purpose of describing specific embodiments and are not intended to limit the disclosure. The term "and/or" as used herein includes any and all combinations of one or more of the relevant listed items.

Figure 1:
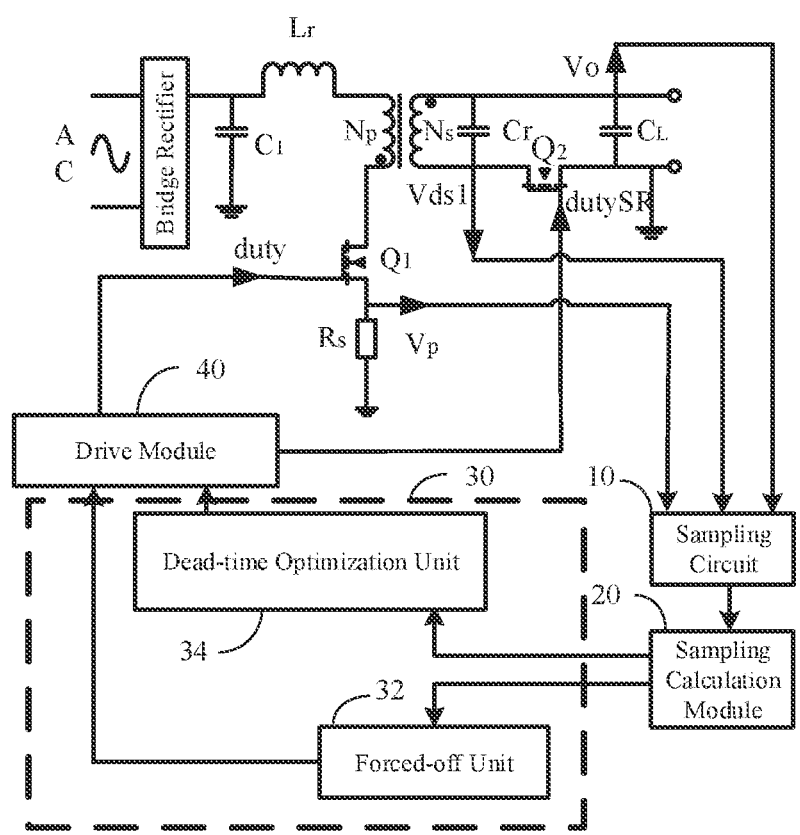
FIG. 1 is a circuit topology diagram of a synchronous rectification control system for a quasi-resonant flyback converter in an embodiment.

FIG. 1 is a circuit topology diagram of a synchronous rectification control system for a quasi-resonant flyback converter in an embodiment. In this embodiment, the converter is a single-transistor quasi-resonant flyback converter, including a primary side of a transformer and a secondary side of the transformer. The primary side includes a primary winding Np, a resonant inductor Lr, a switching transistor Q1, and a sampling resistor Rs. The secondary side includes A secondary winding Ns, a resonant capacitor Cr, an output capacitor CL, and a synchronous rectification transistor Q2. The resonant inductor Lr is connected in series with the primary winding Np. and the synchronous rectification transistor Q2 is connected in series with the secondary winding Ns. In the embodiment shown in FIG. 1, the switching transistor Q1 and the synchronous rectification transistor Q2 are N-channel MOS transistors.

Figure 2:
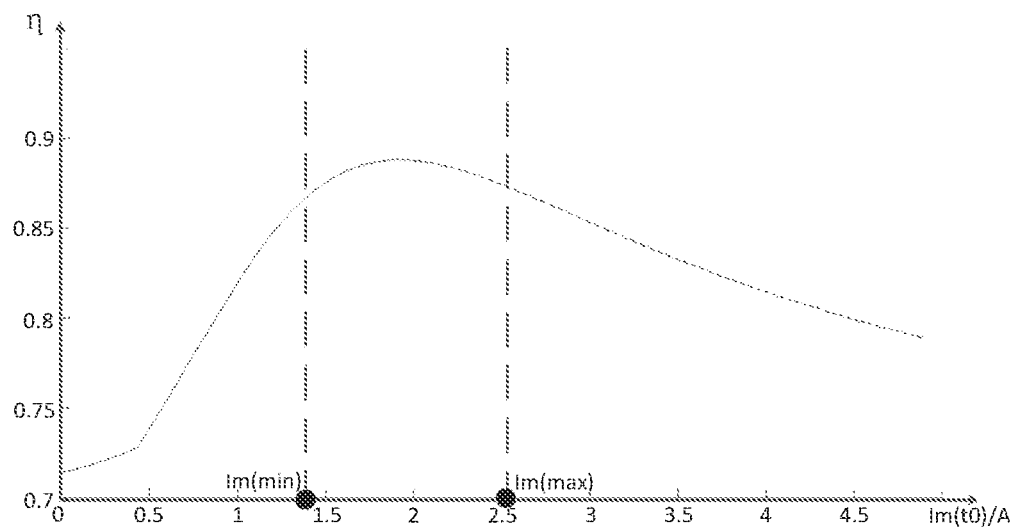
FIG. 2 shows the efficiency η of the a single-transistor quasi-resonant flyback converter with respect to the excitation current starting point Im(t0).

The software Matlab is used to scan the circuit operating states at different excitation current starting points Im(t0) (the starting point is the moment when a switching cycle starts, i.e., when the switching transistor jumps from a low to a high level) in a single cycle, analyze the overall efficiency η of the circuit in a single cycle at different Im(t0), and plot the relationship between the total efficiency η of the MHz-level single-transistor resonant converter and Im(t0), as shown in FIG. 2. When the circuit parameters in the flyback quasi-resonant converter are determined, and the input voltage and the output voltage are fixed, there exists an excitation current zone [Im(min), Im(max)] in which the efficiency is relatively higher. For a switching cycle, if the excitation current Im(t0) at $t_0$ exists in this zone, the overall efficiency η of the converter is higher.

Figure 3:
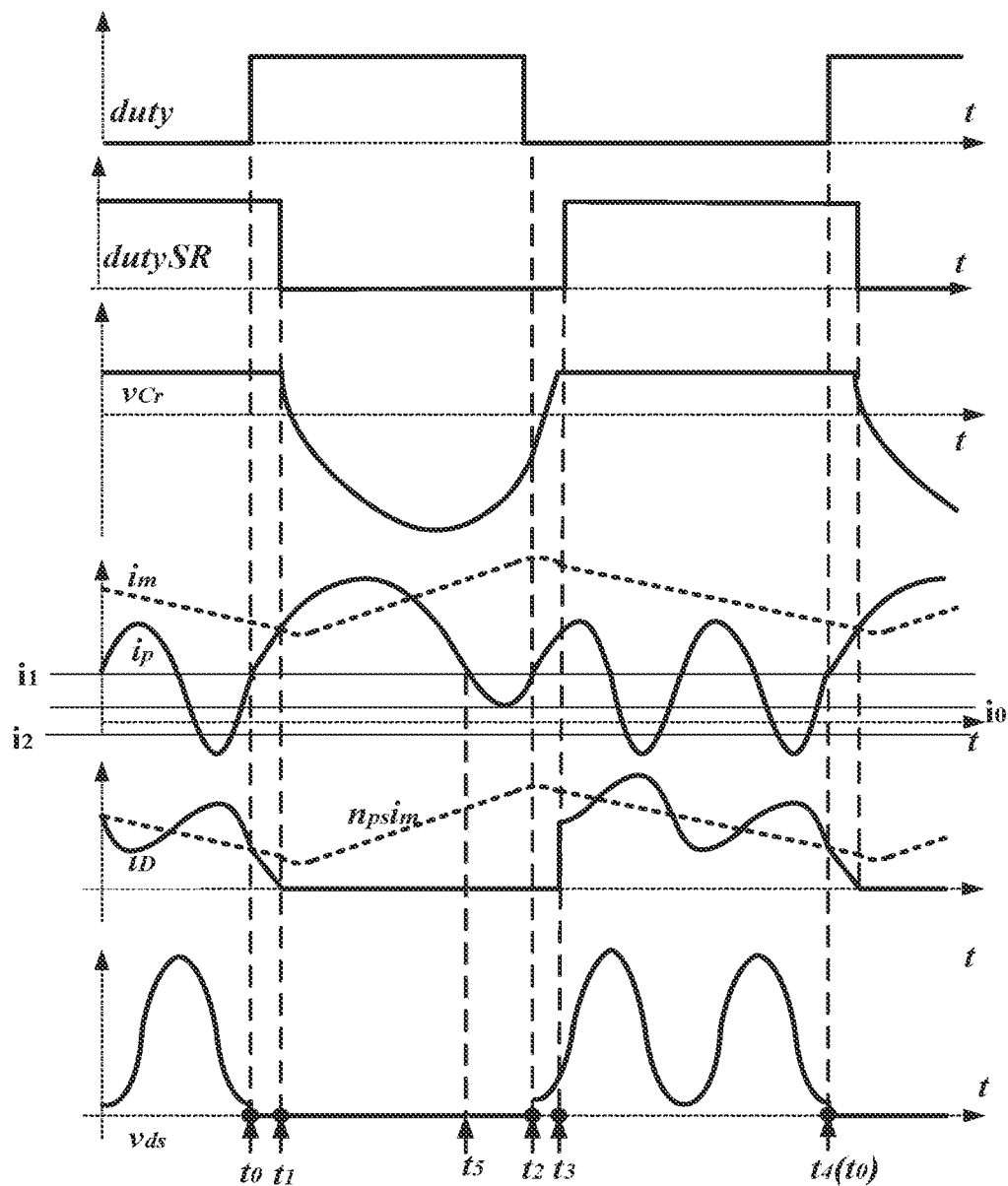
FIG. 3 is a steady-state waveform diagram of a quasi-resonant flyback converter.

FIG. 3 shows the steady-state waveform diagram of the quasi-resonant flyback converter. In an embodiment, the synchronous rectification control system and method of the quasi-resonant flyback converter uses the valley conduction technology (i.e., the switching transistor is on when the voltage between the input terminal and the output terminal resonates to the lowest point of one waveform of the voltage, i.e., for N-channel MOS transistors, it is when the drain-source voltage Vds is at the lowest point of one waveform), which can reduce the losses of the converter and achieve a high converter efficiency. $i_0$ is used to represent the lowest value of the primary-side current during the on-time of the switching transistor when the efficiency is the best. The optimal turn-on time of the switching transistor when the efficiency is the best will fall between two consecutive valleys which are defined as the nth valley and the (n+1)th valley (n is an integer greater than 0). The output voltage is less than a required output voltage when conducted at the nth valley, while the output voltage is greater than the required output voltage when conducted at the (n+1)th valley. Thus, by rationally arranging the switching transistor Q1 to conduct at the two valleys, it can not only meet the requirements of the output voltage, but also achieve valley conduction to reduce losses. $i_1$ is used to represent the lowest value of the primary-side current during the on-time of the switching transistor Q1 when the switching transistor is fixedly conducted at the nth valley, and $i_2$ is used to represent the lowest value of the primary-side current during the on-time of the switching transistor Q1 when the switching transistor is fixedly conducted at the (n+1)th valley conduction. The on-time of switching transistor Q1 is determined by the resonant inductor Lr and the resonant voltage, and the period of each valley in the drain-source voltage Vds waveform is determined by the resonant inductor Lr and the drain-source voltage Vds of the switching transistor Q1. The person skilled in the art can reasonably select the appropriate inductance value/capacitance value for the resonant inductor Lr and resonant capacitor Cr based on the specific switching frequency of the quasi-resonant flyback converter.

In FIG. 3, duty represents the control signal of the gate (control side) of the switching transistor Q1, dutySR represents the control signal of the gate (control side) of the rectification transistor Q2, $V_{Cr}$ represents the voltage of the resonant capacitor Cr, $i_m$ represents excitation current, $i_p$ represents the primary-side current (primary winding current), $i_D$ represents the current of the rectification transistor Q2, $n_{ps}$ represents the primary-to-secondary turns ratio of the transformer, and Vds is the drain-source voltage of the switching transistor Q1. The single switching cycle of the quasi-resonant flyback converter can be divided into four operating states.

Operating state 1, $t_{01}$ ($t_0$ to $t_1$): at $t_0$, the switching transistor Q1 is turned on, and the Vds of sinusoidal waveform is at the lowest point of its resonance, i.e., at the valley, which realizes the valley conduction and greatly reduces the conduction loss. During $t_{01}$, the primary-side current $i_p$ increases linearly, the excitation current $i_m$ decreases linearly, and the current $i_D$ of the rectification transistor Q2 decreases linearly. At $t_1$, $i_D$ decreases to zero, and the rectification transistor Q2 cuts off at the current of zero.

Operating state 2, $t_{12}$ ($t_1$ to $t_2$): at $t_1$, rectification transistor Q2 cuts off, and the input power is stored in the transformer as $i_m$ rises. The primary-side current $i_p$ is formed by superimposing a linear rising component and a sinusoidal component, and when the amplitude of the sinusoidal component is large enough, the primary-side current $i_p$ will reach zero. At $t_2$, the primary-side current $i_p$ rises to zero, and switching transistor Q1 cuts off at the current of zero.

Operating state 3, $t_{23}$ ($t_2$~$t_3$): the voltage $V_{Cr}$ of resonant capacitor Cr is first discharged in the reverse direction and then charged in the forward direction. At $t_2$, switching transistor Q1 cuts off, at this time. $V_{Cr}$ is less than the voltage of output capacitor $C_L$, the rectification transistor Q2 maintains off and $i_D$ is zero. At $t_3$, when $V_{Cr}$ reaches and is clamped at the voltage of output capacitor $C_L$ (i.e. output voltage), the rectification transistor Q2 conducts, and the transformer supplies power to output capacitor $C_L$ and output load through the rectification transistor Q2.

Operating state 4, $t_{34}$ ($t_3$ to $t_4$): at $t_4$, the rectification transistor Q2 conducts and Vds resonates to the lowest point, at which time the switching transistor Q1 conducts and achieves valley conduction.

In the embodiment shown in FIG. 1, the synchronous rectification control system of the quasi-resonant flyback converter includes a sampling circuit 10, a sampling calculation module 20, and a control module 30. The sampling circuit 10 includes a switching transistor voltage sampling circuit for sampling the output terminal voltage of the switching transistor Q1 to obtain the sampled voltage of the switching transistor Vp. In the embodiment shown in FIG.

1, the switching transistor Q1 is an N-channel MOSFET, where the output terminal is the drain, the input terminal is the source, and the control terminal is the gate.

The sampling calculation module 20 is configured to obtain the dead-time based on the sampled voltage of the switching transistor and the preset relationship. The dead-time is the time from when the switching transistor Q1 turns off to when the synchronous rectification transistor Q2 turns on. The preset relationship is the correspondence between the duration Ta of the sampled voltage of the switching transistor Vp below a first preset value and the dead-time Tb during the on-time in one switching cycle of the switching transistor Q1 (i.e., the correspondence between the value of Ta and the value of T). In an embodiment, Ta is the length of time when the primary-side current is less than $i_1$, i.e., the length of time from $t_5$ to $t_2$ in FIG. 3, and Ta corresponds to Tb one-to-one but non-linearly.

The control module 30 receives the dead-time Tb calculated by the sampling calculation module 20 and controls the switching of the switching transistor Q1 and the synchronous rectification transistor Q2 based on the dead-time Tb.

According to the synchronous rectification control system of the above quasi-resonant flyback converter, since the duration of the sampled voltage of the switching transistor below the first preset value can reflect the magnitude of the excitation current, and the charging time of the resonant capacitor (the time required to charge to the output voltage) is related to the magnitude of the excitation current, the synchronous rectification transistor turns on at the moment when the resonant capacitor is charged to the output voltage (i.e., $t_3$ in FIG. 3). Therefore, the duration Ta of the sampled voltage of the switching transistor below the first preset value determines the dead-time Tb, and each Tb value corresponds to a Ta value. The dead-time from the turning off of the switching transistor to the turning on of the synchronous rectification transistor is determined based on the sampled voltage of the switching transistor and the preset relationship, and adaptive control of the dead-time is achieved.

In the embodiment shown in FIG. 1, the synchronous rectification control system of the quasi-resonant flyback converter includes a drive module 40 for driving the switching transistor Q1 and the synchronous rectification transistor Q2 to operate based on the output of the control module 30.

In an embodiment, a correspondence table for the values of Ta and Tb can be established, and a table look-up method is used to obtain the Tb value corresponding to Ta when performing the control. The table can be stored in the control module 30, for example, and the dead-time Tb can be obtained by the control module 30 by looking up the table based on the sampled voltage Vp of the switching transistor. The correspondence table can be obtained by testing a quasi-resonant flyback converter practically.

In an embodiment, the sampling circuit 10 also includes a synchronous rectification transistor voltage sampling circuit for sampling the input terminal voltage of the synchronous rectification transistor Q2 to obtain the sampled voltage Vds1 of the rectification transistor. In the embodiment shown in FIG. 1, the synchronous rectification transistor Q2 is an NMOSFET, and the output terminal is the drain, the input terminal is the source, and the control terminal is the gate. The sampling calculation module 20 obtains the forward on-time of the parasitic diode of the synchronous rectification transistor based on the rectification transistor sampled voltage Vds1. Specifically, if the actual on-time of the synchronous rectification transistor Q2 is less than an ideal on-time of the synchronous rectification transistor, the parasitic diode of the synchronous rectification transistor Q2 will conduct, and the drain-source voltage of the synchronous rectification transistor Q2 will have a small voltage spike, which is equal to the conduction voltage drop of the parasitic diode of the synchronous rectification transistor, and the length is the on-time of the parasitic diode of the synchronous rectification transistor. Therefore, the length of the small spike can be obtained based on the sampled voltage Vds1 of the rectification transistor, and the forward on-time of the parasitic diode of the synchronous rectification transistor Q2 can thus be obtained.

The control module 30 also includes a dead-time optimization unit 34 for adjusting the preset relationship based on the forward on-time so that the forward on-time tends to zero. In an embodiment, if the parasitic diode of the synchronous rectification transistor Q2 is determined to conduct forward during a switching cycle based on the value of the rectification transistor sampled voltage Vds1, the values in the correspondence table described above are corrected based on this forward on-time, so that the data of each cycle optimizes the table, making the dead-time Tb adaptive.

Figure 5:
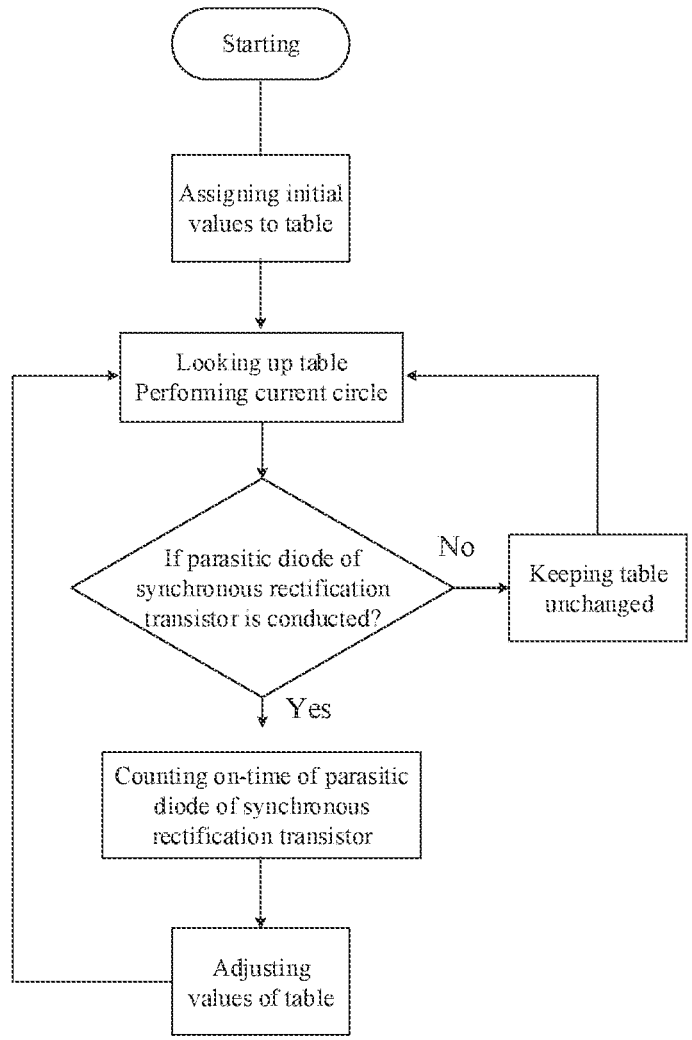
FIG. 5 is a flow chart of synchronous rectification transistor control in an embodiment.

Referring to FIG. 5, initial values may be assigned to the table based on the preset relationship. During the operation of the quasi-resonant flyback converter, switching control in each switching cycle is performed by looking up the table, and whether the parasitic diode of the synchronous rectification transistor Q2 is forward conducted is determined based on the rectification transistor sampled voltage Vds1. If conducted, the on-time is obtained based on the sampled voltage Vds1 of the rectification transistor, and then the value in the table is corrected to make the on-time tend to zero. If not conducted, the value in the table is kept unchanged until the next switching cycle comes.

In an embodiment, the dead-time optimization unit 34 is also configured to delay a safety time before the synchronous rectification transistor Q2 is turned off to avoid reverse conduction of the synchronous rectification transistor Q2. Specifically, if the actual on-time of the synchronous rectification transistor Q2 is larger than the ideal one, it will cause the synchronous rectification transistor to be conducted in reverse, thus the primary-side current rises linearly, and time is prolonged. The increase of the primary-side current and primary-side voltage will destroy the switching transistor Q1. Therefore, a minimum on-time Tc for the parasitic diode can be preset, and Tc is delayed on the basis of the ideal on-time of the synchronous rectification transistor before turning off the synchronous rectification transistor Q2 to ensure that the synchronous rectification transistor will not be conducted in reverse. For the same reason, in another embodiment, a safety time can also be delayed before the synchronous rectification transistor Q2 is turned on. The safety time delayed before turning on and turning off of the synchronous rectification transistor can both be Tc or different.

In an embodiment, the sampling circuit 10 also includes an output voltage sampling circuit for sampling the output voltage of the flyback converter to obtain the output voltage sampled value Vo. The control module 30 also includes a force-off unit 32 for controlling the switching transistor Q1 and synchronous rectification transistor Q2 to turn off when the output voltage sampled value Vo rises to a preset upper limit, and for controlling the switching transistor Q1 and synchronous rectification transistor Q2 to enter normal operation when the output voltage sampled value Vo falls to a preset lower limit. In other words, a force-off state is provided on the basis of the previous control method. By adjusting the preset upper and lower limits, the ripple output by the converter can be controlled within a certain range. In the embodiment shown in FIG. 1, the output voltage sampled value Vo is obtained by sampling the voltage of the output capacitor $C_L$.

In an embodiment, the control module 30 sets an upper off limit value and a lower off limit value for the sampled voltage Vp of the switching transistor, and the control module 30 controls the switching of the switching transistor Q1 based on the upper and lower off limit values to limit the output voltage of the switching transistor Q1 when turned off and control the on-time of the switching transistor Q1 when turned off. In an embodiment, the upper off limit value is $V_0$, and the lower off limit value is $V_2$. $V_0$ is the value of Vp corresponding to the above-mentioned $i_0$, and $V_2$ is the value of Vp corresponding to the above-mentioned $i_2$. In an embodiment, $V_0$ and $V_2$ determine the upper and lower limits for the above-mentioned correspondence table.

Figure 4:
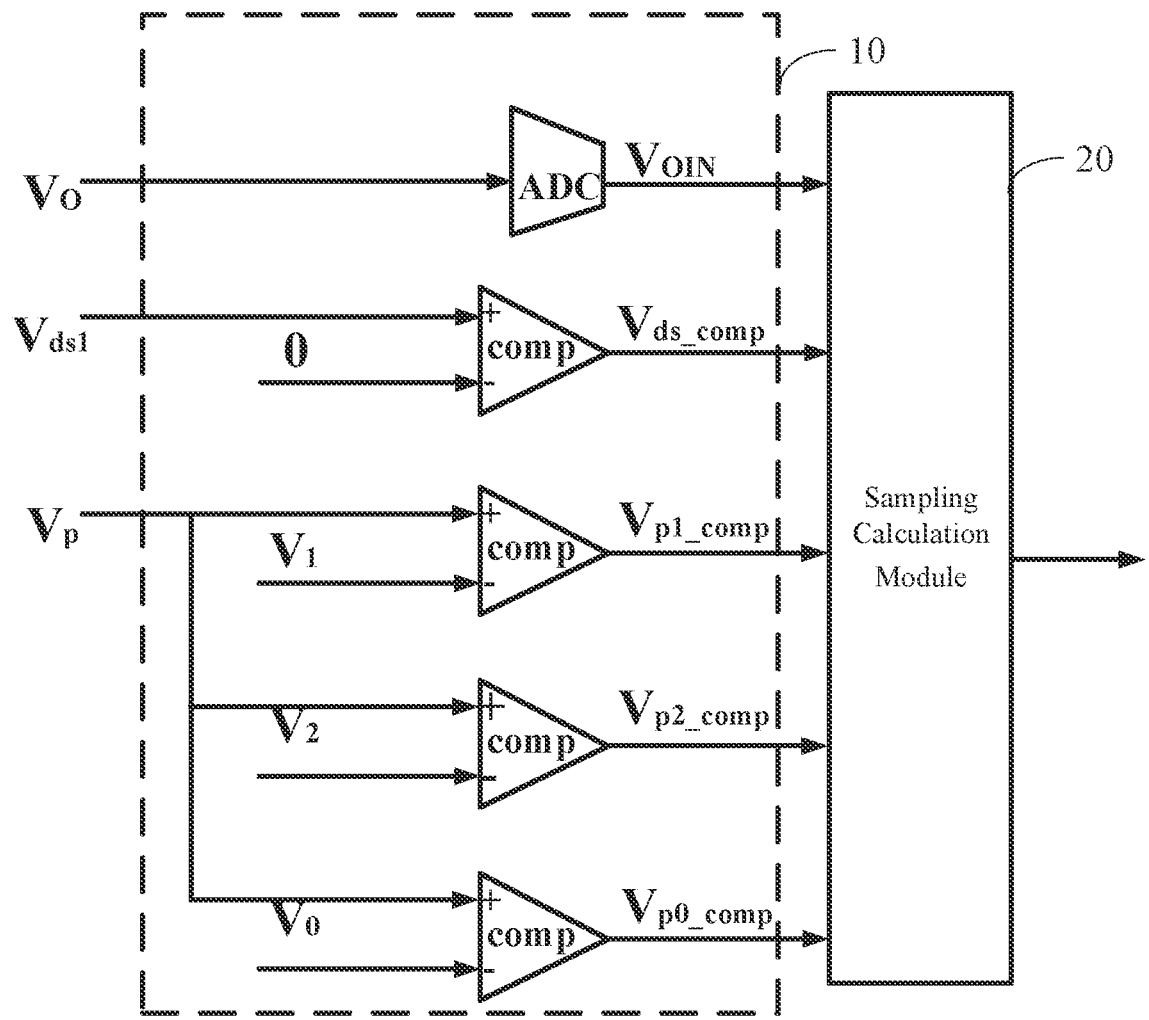
FIG. 4 is a schematic diagram of a structure of a sampling circuit in an embodiment.

FIG. 4 is a schematic diagram of the structure of the sampling circuit 10 in an embodiment, in which the sampling circuit 10 includes an analog-to-digital converter ADC and four comparators comp. The output voltage sampled value Vo is converted from analog to digital to obtain $V_{OIN}$ which is output to the sampling calculation module 20. The sampled voltage Vds1 of the rectification transistor is input to the non-inverting input terminal of the first comparator, and a zero potential is input to the inverting input terminal of the first comparator. Vds_comp output from the output terminal of the first comparator is also sent to the sampling calculation module 20. The sampling voltage Vp of the switching transistor is input to the non-inverting input terminals of the other three comparators, and $V_1$, $V_2$, and $V_0$ are input to the inverting input terminals of the three comparators, respectively. The Vp1_comp, Vp2_comp, and Vp0_comp output from the output terminals of the three comparators are sent to the sampling calculation module 20. In above, $V_1$ is the value of Vp corresponding to the above-mentioned $i_1$, $V_2$ is the value of Vp corresponding to the above-mentioned $i_2$, and $V_0$ is the value of Vp corresponding to the above-mentioned $i_0$. The signals output by the sampling circuit 10 are sent to the sampling calculation module 20 to perform calculations such as counting, and the sampling calculation module 20 then sends the required data to the control module 30. In an embodiment, the control module 30 includes an MCU. For example, an MCU equipped with a comparator, a register, a counter, and an adder, and having an addition and subtraction function can be used to form the control module 30.

According to the above description, in the embodiment shown in FIG. 4, the two comparators to which $V_0$ and $V_2$ are input are used to set the upper and lower limits for the correspondence table, so that the table can be set without using these two comparators after the initial setting is completed. During the actual use of the quasi-resonant flyback converter, the upper and lower limits of the table can be called directly (the upper and lower limits are first obtained with the comparator open-loop test for subsequent use), so the correspondence table can actually be set without using these two comparators during use.

Figure 6:
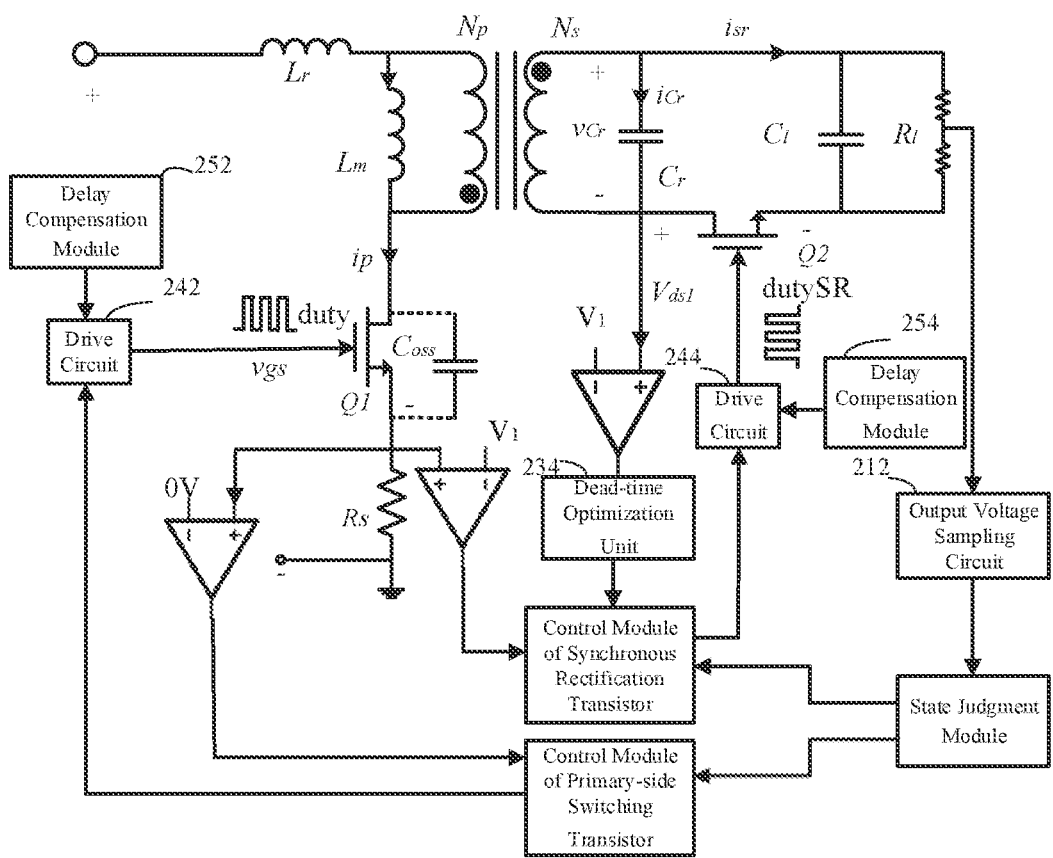
FIG. 6 is a circuit topology diagram of the synchronous rectification control system of a quasi-resonant flyback converter in another embodiment.

FIG. 6 shows the circuit topology of the synchronous rectification control system of a quasi-resonant flyback converter in another embodiment. In FIG. 6, Lm represents an ideal transformer inductance, and the parasitic capacitor of the switching transistor Q1 is represented by Coss. The operating principle of the circuit structure of FIG. 6 can be referred to FIG. 1, where the dead-time optimization unit 234 in FIG. 6 corresponds to the dead-time optimization unit 34 in FIG. 1. The output voltage sampling circuit 212 is used to sample the output voltage of the flyback converter. The state judgment module is used to control the switching transistor Q1 and the synchronous rectification transistor Q2 to enter forced-off state when the output voltage sampled value rises to a preset upper limit value, and control the switching transistor Q1 and synchronous rectification transistor Q2 to enter the normal operation state when the output voltage sampled value Vo falls to the preset lower limit value. The driver circuit 242 and the driver circuit 244 correspond to the driver module 40 in FIG. 1 and are configured to drive the switching transistor Q1 and the synchronous rectification transistor Q2 respectively. The synchronous rectification control system of the quasi-resonant flyback converter in FIG. 6 also includes a delay compensation module 252 connected to the drive circuit 242 and a delay compensation module 254 connected to the drive circuit 244 for compensating the delay of the drive circuit.

The present disclosure also accordingly provides a synchronous rectification control method for a quasi-resonant flyback converter, which includes sampling an output terminal voltage of the switching transistor to obtain a sampled voltage of the switching transistor; obtaining a dead-time based on the sampled voltage of the switching transistor and a preset relationship, the preset relationship being a correspondence between a duration of the sampled voltage of the switching transistor being below a first preset value and the dead-time during an on-time of the switching cycle, the dead-time being a time from when the switching transistor is turned off to when the synchronous rectification transistor is turned on; and controlling switching of the synchronous rectification transistor based on the dead-time.

In an embodiment, the control method further includes sampling an input terminal voltage of the synchronous rectification transistor to obtain a sampled voltage of the rectification transistor; obtaining a forward on-time of a parasitic diode of the synchronous rectification transistor based on the sampled voltage of the rectification transistor; and adjusting the preset relationship based on the forward on-time so that the forward on-time tends to zero.

In an embodiment, the control method further includes a step of delaying a safe time before the synchronous rectification transistor is turned on to avoid reverse conduction of the synchronous rectification transistor. In another embodiment, for the same reason, a safety time may also be delayed before the synchronous rectification transistor is turned off.

In an embodiment, the control method further includes sampling an output voltage of the flyback converter to obtain an output voltage sampled value; controlling the switching transistor and synchronous rectification transistor to be turned off when the output voltage sampled value rises to a preset upper limit value; and controlling the switching transistor and synchronous rectification transistor to enter a normal operating state when the output voltage sampled value falls to a preset lower limit value.

In an embodiment, a step of outputting a switching transistor control signal to the control terminal of the switching transistor to control turning on and off of the switching transistor is further included. The switching transistor control signal controls the switching transistor to turn on when a voltage between an input terminal and the output terminal of the switching transistor reaches a valley. The valley of the voltage between the input terminal and the output terminal occurs once or more during one switching cycle of the switching transistor. The first preset value is a voltage value of the sampled voltage of the switching transistor when a primary-side current of the flyback converter is at a first current value. The first current value is the lowest value of the primary-side current during the on-time when the switching transistor is fixedly conducted at the nth valley. The switching transistor turn-on time corresponding to the best efficiency of the flyback converter is between the nth valley and the (n+1)th valley of the current switching cycle, n is an integer greater than 0. In an embodiment, the control method further includes a step of setting an upper off limit value and a lower off limit value of the sampled voltage of the switching transistor, and controlling the switching transistor to turn off based on the upper off limit value and the lower off limit value to limit the output terminal voltage of the switching transistor when the switching transistor is off, and to control the on-time of the switching transistor.

In an embodiment, the lower off limit is the voltage value of the sampled voltage of the switching transistor when the primary-side current of the flyback converter is a second current value, and the second current value is the lowest value of the primary-side current during the on-time when the switching transistor is fixedly conducted at the (n+1)th valley. The upper off limit is a voltage value of the sampled voltage of the switching transistor when the primary-side current of the flyback converter recursive is a third current value, and the third current value is the lowest value of the primary-side current during the on-time when the switching transistor is conducted at the best efficiency of the flyback converter.

In an embodiment, the control method further includes a step of obtaining a correspondence table for the duration and the dead-time, and the step of obtaining the dead-time based on the sampled voltage of the switching transistor and a preset relationship is performed by looking up the table to obtain the dead-time.

In the above synchronous rectification control system and method for a quasi-resonant flyback converter, the magnitude of the excitation current is determined based on Ta, and thus the dead-time Tb before the synchronous rectification transistor turns on is determined. Adaptive dead-time is realized by means of a table look-up method. The operation of the synchronous rectification transistor in the current cycle is controlled by a recursive table look-up with the switching information of a plurality of operating cycles, and based on the voltage difference of the parasitic diode of the synchronous rectification transistor when conducted, the on and off points of the synchronous rectification transistor are determined, so the optimal switching time of the synchronous rectification transistor can be determined, and adaptive dead-time of the synchronous rectification transistor can be realized. In practice, for quasi-resonant flyback converters in different operating states, as long as the initial value of the dead-time is set to a larger value (relative to an empirical value), the optimal switching time can be found quickly with safety.

The above described embodiments are only several embodiments of the disclosure, which are described in a specific and detailed manner, but they should not be understood as a limitation of the patent scope of the present disclosure. It should be pointed out that for a person of ordinary skill in the art, a number of modifications and improvements can be made without departing from the concept of the present disclosure, which all belong to the scope of protection of the present disclosure. Therefore, the protection scope of the present disclosure shall be subject to the accompanying claims.

What is claimed is:

1. A synchronous rectification control method for a quasi-resonant flyback converter, the flyback converter comprising a primary side of a transformer and a secondary side of the transformer, the primary side comprising a primary winding and a switching transistor, the secondary side comprising a secondary winding, a synchronous rectification transistor and a resonant capacitor, the method comprising:

sampling an output terminal voltage of the switching transistor to obtain a sampled voltage of the switching transistor;

obtaining a dead-time based on the sampled voltage of the switching transistor and a preset relationship, the preset relationship being a correspondence between a duration of the sampled voltage of the switching transistor being below a first preset value during an on-time of the switching cycle and the dead-time, the dead-time being a time from when the switching transistor is turned off to when the synchronous rectification transistor is turned on;

controlling switching of the synchronous rectification transistor based on the dead-time;

outputting a switching transistor control signal to a control terminal of the switching transistor to control turning on and off of the switching transistor, the switching transistor control signal controlling the switching transistor to turn on when a voltage between an input terminal and the output terminal of the switching transistor reaches a valley, the valley of the voltage between the input terminal and the output terminal occurring once or more during one switching cycle of the switching transistor, the first preset value being a voltage value of the sampled voltage of the switching transistor when a primary-side current of the flyback converter is at a first current value, the first current value being the lowest value of the primary-side current during an on-time when the switching transistor is fixedly conducted at the nth valley conduction, the switching transistor turn-on time corresponding to the best efficiency of the flyback converter being between the nth valley and the (n+1)th valley of a current switching cycle, n being an integer greater than 0; and setting an upper off limit value and a lower off limit value of the sampled voltage of the switching transistor, and controlling the switching transistor to turn off based on the upper off limit value and the lower off limit value to limit the output terminal voltage of the switching transistor when the switching transistor is off, and to control the on time of the switching transistor;

wherein the lower off limit is a voltage value of the sampled voltage of the switching transistor when the primary-side current of the flyback converter is a second current value, the second current value being the lowest value of the primary-side current during an on-time when the switching transistor is fixedly conducted at the (n+1)th valley; the upper off limit is a voltage value of the sampled voltage of the switching transistor when the primary-side current of the flyback converter is a third current value, the third current value being the lowest value of the primary-side current during an on-time when the switching transistor is conducted at the best efficiency of the flyback converter.

2. The method according to claim 1, further comprising:

sampling an input terminal voltage of the synchronous rectification transistor to obtain a sampled voltage of the rectification transistor;

obtaining a forward on-time of a parasitic diode of the synchronous rectification transistor based on the sampled voltage of the rectification transistor; and adjusting the preset relationship based on the forward on-time so that the forward on-time tends to zero.

3. The method according to claim 1, further comprising: delaying a safe time before the synchronous rectification transistor is turned on to avoid reverse conduction of the synchronous rectification transistor.

4. The method according to claim 1, further comprising: delaying for a safe time before the synchronous rectification transistor is turned off to avoid reverse conduction of the synchronous rectification transistor.

5. The method according to claim 1, further comprising: delaying a safety time before the synchronous rectification transistor is turned on and before it is turned off to avoid reverse conduction of the synchronous rectification transistor.

6. The method according to claim 1, further comprising: sampling an output voltage of the flyback converter to obtain an output voltage sampled value;
controlling the switching transistor and synchronous rectification transistor to be turned off when the output voltage sampled value rises to a preset upper limit value; and
controlling the switching transistor and synchronous rectification transistor to enter a normal operating state when the output voltage sampled value falls to a preset lower limit value.

7. A synchronous rectification control system for a quasi-resonant flyback converter, the flyback converter comprising a primary side of a transformer and a secondary side of the transformer, the primary side comprising a primary winding and a switching transistor, the secondary side comprising a secondary winding, a synchronous rectification transistor and a resonant capacitor, the system comprising:
a switching transistor voltage sampling circuit configured to sample an output terminal voltage of the switching transistor to obtain a sampled voltage of the switching transistor;
a sampling calculation module configured to obtain a dead-time based on the sampled voltage of the switching transistor and a preset relationship, the preset relationship being a correspondence between the duration of the sampled voltage of the switching transistor being below a first preset value during an on-time of a switching cycle of the switching transistor and the dead-time, the dead-time being a time from when the switching transistor is turned off to when the synchronous rectification transistor is turned on; and
a control module configured to receive the dead-time and control switching of the synchronous rectification transistor based on the dead-time, and configured to output a switching transistor control signal to a control terminal of the switching transistor to control the turning on and off of the switching transistor, the switching transistor control signal controlling the switching transistor to turn on when a voltage between the input terminal and the output terminal of the switching transistor reaches a valley, the valley occurring once or more in one switching cycle of the switching transistor, the first preset value being a voltage value of the sampled voltage of the switching transistor when a primary-side current of the flyback converter is at a first current value, the first current value being the lowest value of the primary-side current during an on-time when the switching transistor is fixedly conducted at the nth valley, the switching transistor turn-on time corresponding to the best efficiency of the flyback converter being between the nth valley and the (n+1)th valley of a current switching cycle n being an integer greater than 0;
wherein the control module is further configured to set an upper off limit value and a lower off limit value of the sampled voltage of the switching transistor, and control the switching transistor to turn off based on the upper off limit value and the lower off limit value to limit the output terminal voltage of the switching transistor when the switching transistor is off, and to control the on time of the switching transistor;
wherein the lower off limit is a voltage value of the sampled voltage of the switching transistor when the primary-side current of the flyback converter is a second current value, the second current value being the lowest value of the primary-side current during an on-time when the switching transistor is fixedly conducted at the (n+1)th valley; the upper off limit is a voltage value of the sampled voltage of the switching transistor when the primary-side current of the flyback converter is a third current value, the third current value being the lowest value of the primary-side current during an on-time when the switching transistor is conducted at the best efficiency of the flyback converter.

8. The synchronous rectification control system according to claim 7, further comprising a synchronous rectification transistor voltage sampling circuit configured to sample an input terminal voltage of the synchronous rectification transistor to obtain a sampled voltage of the rectification transistor, and the sampling calculation module is further configured to obtaining a forward on-time of a parasitic diode of the synchronous rectification transistor based on the sampled voltage of the rectification transistor, the control module further comprising a dead-time optimization unit configured to adjust the preset relationship based on the forward on-time so that the forward on-time tends to zero.

9. The synchronous rectification control system according to claim 7, further comprising an output voltage sampling circuit configured to sample an output voltage of the flyback converter to obtain an output voltage sampled value, the control module further comprising a force-off unit configured to control the switching transistor and synchronous rectification transistor to turn off when the output voltage sampled value rises to a preset upper limit, and control the switching transistor and synchronous rectification transistor to enter a normal operating state when the output voltage sampled value falls to a preset lower limit.

10. The synchronous rectification control system according to claim 7, further comprising:
a drive circuit connected between the control module and the synchronous rectification transistor and configured to drive the synchronous rectification transistor to operate based on an output of the control module
a delay compensation module connected to the drive circuit and configured to compensate the delay of the drive circuit.

11. The synchronous rectification control system according to claim 7, wherein the switching transistor and synchronous rectification transistor are N-channel NIOS transistors, the source of the N-channel MOS transistor being the input terminal and the drain being the output terminal.

* * * * *